PIEZOELECTRIC AND ELECTROSTRICTIVE CERAMIC ARTICLES OF LEAD ZIRCONATE TITANATE CONTAINING MANGANESE AND TUNGSTEN OXIDES

Filed March 15, 1965 3 Sheets-Sheet 1

INVENTOR
Hisao Banno
BY
Stevens, Davis, Miller & Mosher, ATTORNEYS

INVENTOR

Hisao Banno

BY

Stevens, Davis, Miller & Mosher, ATTORNEYS

March 5, 1968 HISAO BANNO 3,372,121

PIEZOELECTRIC AND ELECTROSTRICTIVE CERAMIC ARTICLES OF LEAD ZIRCONATE TITANATE CONTAINING MANGANESE AND TUNGSTEN OXIDES

Filed March 15, 1965 3 Sheets-Sheet 3

INVENTOR

Hisao Banno

BY

Stevens, Davis, Miller & Mosher ATTORNEYS

United States Patent Office 3,372,121
Patented Mar. 5, 1968

3,372,121

PIEZOELECTRIC AND ELECTROSTRICTIVE CERAMIC ARTICLES OF LEAD ZIRCONATE TITANATE CONTAINING MANGANESE AND TUNGSTEN OXIDES

Hisao Banno, Ueno-machi, Japan, assignor to NGK Spark Plug Co., Ltd., Nagoya, Japan
Filed Mar. 15, 1965, Ser. No. 439,676
14 Claims. (Cl. 252—62.9)

ABSTRACT OF THE DISCLOSURE

Piezoelectric and electrostrictive ceramic articles having a composition consisting essentially of Pb(Zr-Ti)$O_3$ or PB(Zr-Sn-Ti)$O_3$ wherein a part of Pb is replaceable by at least one alkaline earth element selected from the group consisting of Ba, Ca, Sr and Mg, and containing W and Mn to particularly improve mechanical Q of the ceramic articles which is especially important in their application to a ceramic wave filter, a mechanical wave filter and a piezoelectric tuning fork.

It is well known that the ceramic material of solid solution of lead titanate and lead zirconate, $Pb(Ti_x\text{-}Zr_{1-x})O_3$ shows the largest piezoelectric and electrostrictive effects when $x=0.1$ to 0.6 more particularly, at a composition of $x=0.42$ to 0.52 showing morphotropic transformation, and also the composition of Pb(Ti-Zr-Sn)$O_3$ consisting of a solid solution of lead titanate, lead zirconate and lead stannate derived from the standard composition Pb(Ti-Zr)$O_3$.

Moreover, it has also been known that the compositions expressed by (Pb-Sr)(Ti-Zr)$O_3$ or (Pb-Sr)(Ti-Zr-Sn)$O_3$ which is formed by substituting a part of Pb from the standard type of Pb(Ti-Zr)$O_3$ and Pb(Ti-Zr-Sn)$O_3$ derived therefrom, with one or more of alkaline earth metals such as Sr, Ba and Ca at a rate less than 30 atom percent have improved electromechanical coupling coefficient and dielectric constant if compared with the original type. I have already disclosed and claimed in my copending U.S. patent application Serial No. 289,811 filed on June 24, 1963, that if 0.2–20% by weight of tungsten oxide is added to the above mentioned known compositions such as so-called "PZT" type ceramics, then electromechanical coupling coefficient $K_p$, dielectric constant $\epsilon$ and specific electric resistance thereof are greatly improved and, in addition, the time stability of the electromechanical coupling coefficient and dielectric constant are also improved to a considerable extent.

$Q_M$, i.e., mechanical Q. Still another object of the invention is to provide ceramic articles having excellent piezoelectric and electrostrictive characteristics, especially epoch-making characteristics as elements of ceramic wave filters, mechanical wave filters and piezoelectric tuning forks.

For a better understanding of the invention reference is taken to the accompanying drawings showing characteristics of ceramic articles of the invention when either one or both of tungsten oxide and manganese oxide are added to base composition comprising lead-titanate-zirconate compounds, in which FIG. 1 is a diagram illustrating time characteristic of electromechanical coupling coefficient $K_p$;

The invention will now be further explained in details by examples.

*Example 1*

Following 4 samples were prepared starting from a common base composition of $Pb(Zr_{0.51}\text{-}Ti_{0.49})O_3$ which was prepared by using PbO, $TiO_2$ and $ZrO_2$ at a ratio of 224.33 g. of PbO, 39.95 g. of $TiO_2$ and 62.97 g. of $ZrO_2$.

Sample A: with addition of both 2% by weight of $WO_3$ and 0.75% by weight of $MnO_2$ (composition of the present invention).

Sample B: with addition of 2% by weight of $WO_3$.

Sample C: with addition of 0.75% by weight of $MnO_2$.

Sample D: with no addition.

Each of the above samples was mixed, ground, molded, calcined at 700–1000° C., ground again, shaped and then sintered at 1100–1400° C. in PbO atmosphere to obtain disks of about 0.8 mm. thick and about 20 mm. dia. The disks thus obtained were electroded and polarized for 1 hour with a direct current voltage of 40 kv./cm. at 80° C., then exposed to the open air for a week and thereafter various characteristics were measured. The results are shown in Table 1.

TABLE 1

| Sample | Addition to a base composition $Pb(Zr_{0.51}\text{-}Ti_{0.49})O_3$ | Electromechanical coupling coefficient $K_p$ (percent) | Resistance at resonance frequency $R_0$ (ohm) | Dielectric constant, $\epsilon$ | Mechanical Q, $Q_M$ |
|---|---|---|---|---|---|
| A | 2% by weight of $WO_3$ and 0.75% by weight of $MnO_2$. | 60 | 2 | 1,200 | 750 |
| B | 2% by weight of $WO_3$ | 57 | 18 | 1,500 | 85 |
| C | 0.75% by weight of $MnO_2$ | 30 | 15 | 700 | 500 |
| D | None | 42 | 15 | 800 | 300 |

Figure 1:
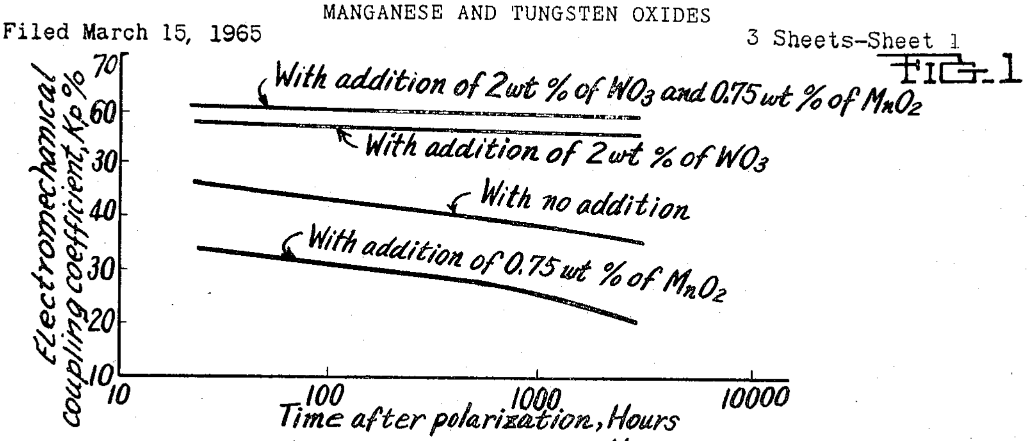
Figure 2:
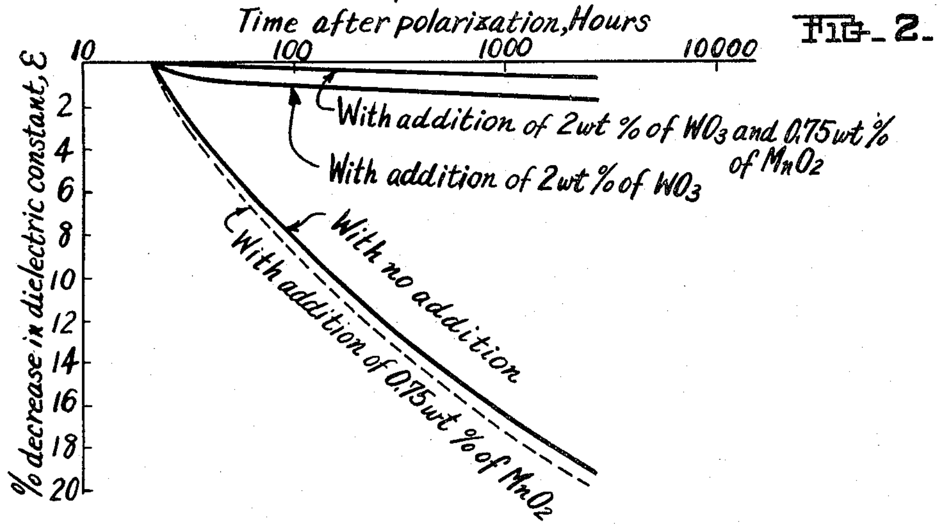
FIG. 2 is a diagram illustrating time characteristic of dielectric constant $\epsilon$.
Figure 3:
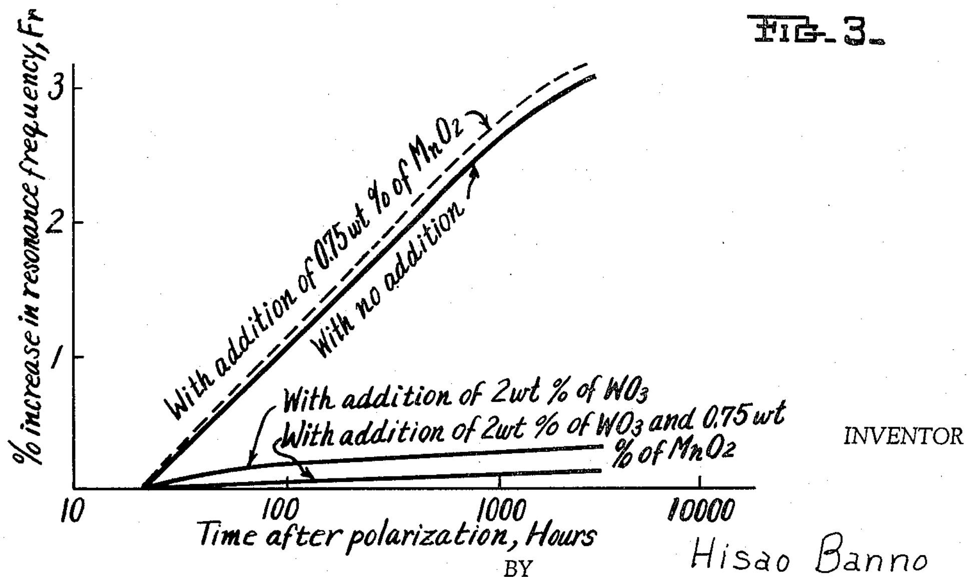
FIG. 3 is a diagram illustrating time characteristic of resonance frequency $F_r$.

The principal object of the invention is to provide further improvement of electromechanical coupling coefficient $K_p$, dielectric constant $\epsilon$ and specific electric resistance as well as time and temperature stability of PZT ceramic articles by simultaneously adding 0.2–20% by weight of tungsten oxide and 0.075–7.5% by weight of manganese oxide to said so-called "PZT" type ceramics as described in details hereinafter. Another object of the invention is to provide ceramic articles having a very high It is apparent from Table 1 that a ceramic article of the invention, which corresponds to the above composition A consisting essentially of $Pb(Zr_{0.51}\text{-}Ti_{0.49})O_3$ with addition of 2% by weight of $WO_3$ and 0.75% by weight of $MnO_2$, is provided with a dielectric constant $\epsilon$ which is slightly lower than that of Sample B but highter than those of Samples C and D an electromechanical coupling coefficient $K_p$ which is higher than any one of those of Samples B, C and D an electrical resistance $R_0$ at resonance frequency and a mechanical Q which are excellent and far exceed those of Samples B, C and D The time stabilities of the electromechanical coupling coefficient $K_p$, dielectric constant $\epsilon$ and resonance frequency $F_r$ are shown in FIGS. 1 to 3. It is apparent from FIGS. 1 to 3 that the ceramic articles of the invention including 2% by weight of $WO_3$ and 0.75% by weight of $MnO_2$ have stable values of electromechanical coupling coefficient $K_p$, dielectric constant $\epsilon$ and resonance frequency $F_r$, and practically no drift of any of the values was noticed throughout the time of the measurement.

Figure 4:
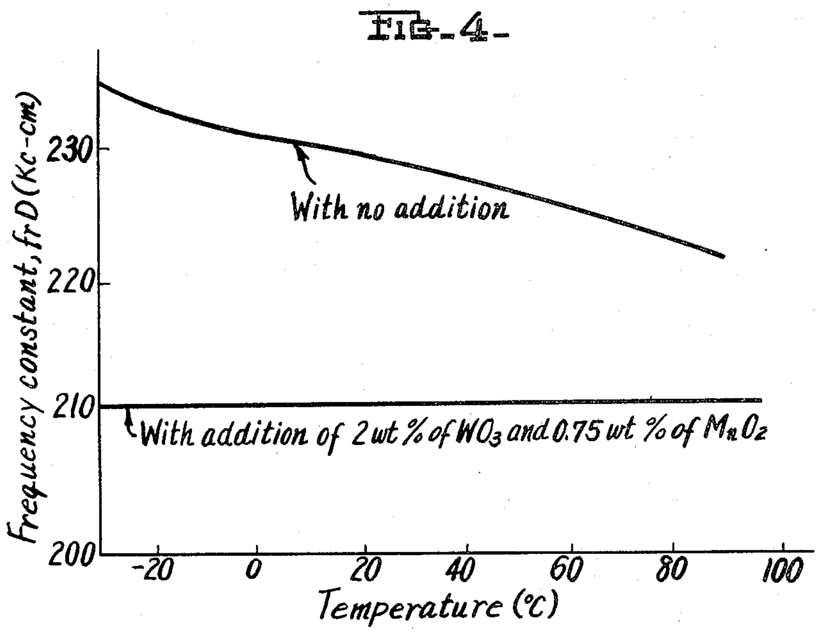
FIG. 4 is a diagram illustrating temperature characteristic of the frequency constant $F_rD$.
Figure 5:
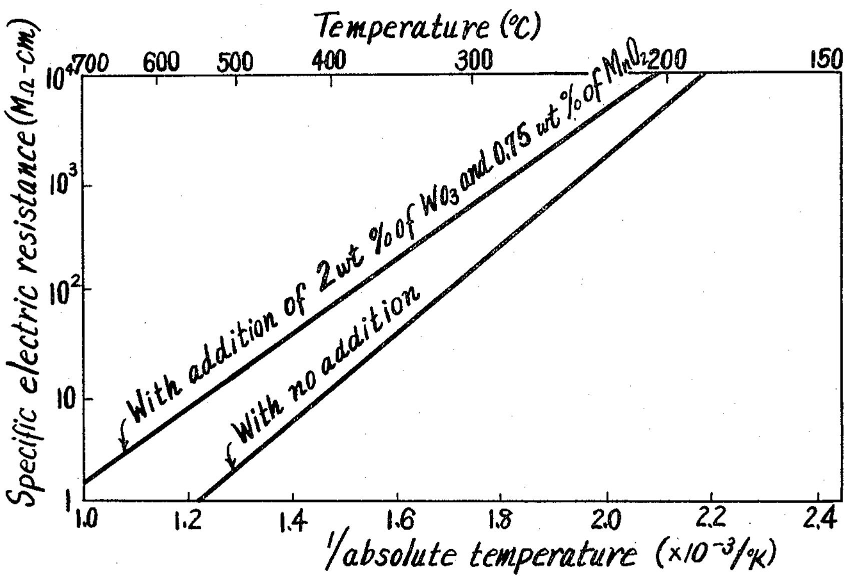
FIG. 5 is a diagram illustrating temperature characteristic of the specific electric resistance.

The temperature stability of the frequency constant $F_rD$ and the specific electric resistance at elevated temperatures are improved to a considerable extent compared with those of samples having no additives as shown in FIGS. 4 and 5.

*Example 2*

Figure 6:
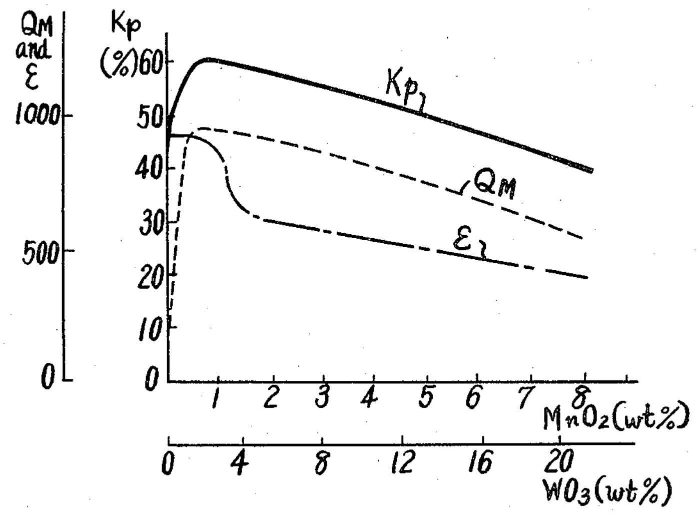
FIGS. 6 and 7 are diagrams illustrating the variation of electromechanical coupling coefficient $K_p$, dielectric constant $\epsilon$ and mechanical Q when the addition quantities of tungsten oxide and manganese oxide are varied and when a part of Pb is substituted with strontium respectively.

A part of Pb in the base composition was substituted with Sr to produce a new base composition consisting essentially of $(Pb_{0.95}\text{-}Sr_{0.05})(Zr_{0.54}\text{-}Ti_{0.46})O_3$. Four different sample disks of about 0.8 mm. thick and about 20 mm. dia. were prepared with said substituted base composition in the same manner as Example 1. The characteristics of sample disks thus obtained were measured and the results are shown in Table 2.

were measured, and the results are shown in FIG. 6. It is apparent from FIG. 6 that the additives are most effective when approximately 2% by weight of $WO_3$ and approximately 0.75% by weight of $MnO_2$ are added.

*Example 4*

To a base composition $(Pb_{1-a}\text{-}Sr_a)(Zr_{0.52}\text{-}Ti_{0.48})O_3$ which was a derivative of $Pb(Zr\text{-}Ti)O_3$ by partial substitution of Pb with Sr, 2% by weight of $WO_3$ and 0.75% by weight of $MnO_2$ were added, and further 2% by weight of PbO was added to equilibrate with $WO_3$, that is to say the addition rate of PbO was to be $PbO:WO_3=1:1$ by mol or $PbO:WO_3=233.2:231.9\doteqdot1:1$ by weight. The electromechanical coupling coefficient $K_p$ dielectric constant $\epsilon$ and mechanical Q of samples thus prepared were measured, and the results are shown in FIG. 7.

Figure 7:
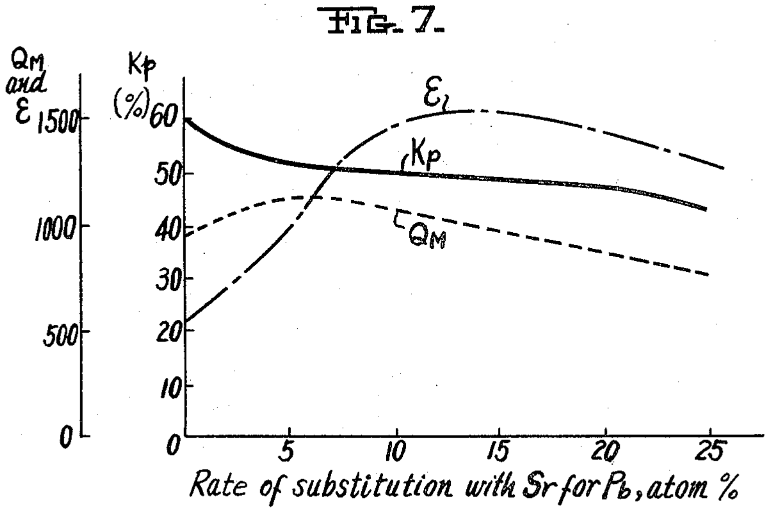

It is apparent from FIG. 7 that the electromechanical coupling coefficient $K_p$ is gradually reduced as the rate of substitution with Sr for Pb increases, and the dielectric constant $\epsilon$ and mechanical Q give their maximum values at about 12.5 atom percent of rate of substitution with Sr for Pb and at about 5 atom percent of the same rate respectively. The effects of adding $WO_3$ and $MnO_2$ are apparent in FIG. 7.

*Example 5*

To the following compositions, which were typical com-

TABLE 2

| Sample | Addition to base composition $(Pb_{0.95}\text{-}Sr_{0.05})(Zr_{0.54}\text{-}Ti_{0.46})O_3$ | Electromechanical coupling coefficient $K_p$ (percent) | Resistance at resonance frequency Ro (ohm) | Dielectric constant, $\epsilon$ | Mechanical Q, $Q_M$ |
|---|---|---|---|---|---|
| A' | 2% by weight of $WO_3$ and 0.4% by weight of $MnO_2$. | 55 | 3 | 700 | 1,100 |
| B' | 2% by weight of $WO_3$ | 68 | 12 | 2,000 | 70 |
| C' | 0.4% by weight of $MnO_2$ | 23 | 24 | 700 | 600 |
| D' | None | 48 | 10 | 850 | 300 |

It is apparent from Table 2 that, except for the dielectric constant, the ceramic article of the invention, which corresponds to the above composition A' consisting essentially of $(Pb_{0.95}\text{-}Sr_{0.05})(Zr_{0.54}\text{-}Ti_{0.46})O_3$ and with addition of 2% by weight of $WO_3$ and 0.4% by weight of $MnO_2$, was provided with an electromechanical coupling coefficient $K_p$ which is lower than that of Sample B' but higher than those of Samples C' and D' a resistance $R_0$ at resonance frequency and a mechanical Q, which are especially excellent having a ratio of about 3.5 corresponding values of Sample D' which has no additives

*Example 3*

To a base composition of $Pb(Zr_{0.51}\text{-}Ti_{0.49})O_3$ different amounts of $WO_3$ and $MnO_2$ were added while keeping the ratio of the two additives at $WO_3:MnO_2=4:1.5$ by weight. The electromechanical coupling coefficient $K_p$, dielectric constant $\epsilon$ and mechanical Q of samples thus prepared positions produced by partially substituting Pb of $$Pb(Zr\text{-}Ti)O_3$$

with Ba, Ca or Mg and a typical composition consisting essentially of a solid solution of lead-titanate-zirconate-stannate derived from the base composition of $$Pb(ZrTi)O_3$$

2% by weight of $WO_3$ and 0.75% by weight of $MnO_2$ was added, and further 2% by weight of PbO was added to equilibrate with $WO_3$.

$(Pb_{0.825}\text{-}Ba_{0.175})(Zr_{0.54}\text{-}Ti_{0.46})O_3$
$(Pb_{0.95}\text{-}Ca_{0.05})(Zr_{0.54}\text{-}Ti_{0.46})O_3$
$(Pb_{0.95}\text{-}Mg_{0.05})(Zr_{0.52}\text{-}Ti_{0.48})O_3$
$Pb(Zr_{0.43}\text{-}Ti_{0.47}\text{-}Sn_{0.10})O_3$ The effects of such additions on the electromechanical coupling coefficient $K_p$, dielectric constant $\epsilon$ and mechanical Q were measured, and the results are shown in Table 3.

TABLE 3

| Sample | Composition | Electromechanical coupling coefficient $K_p$ (percent) | Dielectric constant $\epsilon$ | Mechanical Q, $Q_M$ |
|---|---|---|---|---|
| E-1 | $(Pb_{0.825}\text{-}Ba_{0.175})(Zr_{0.54}\text{-}Ti_{0.46})O_3$ | 56 | 1,400 | 300 |
| E-2 | $(Pb_{0.825}\text{-}Ba_{0.175})(Zr_{0.54}\text{-}Ti_{0.46})O_3$+2 wt. percent $WO_3$+0.75 wt. percent $MnO_2$+2 wt. percent PbO | 52 | 1,000 | 600 |
| F-1 | $(Pb_{0.95}\text{-}Ca_{0.05})(Zr_{0.54}\text{-}Ti_{0.46})O_3$ | 50 | 1,000 | 250 |
| F-2 | $(Pb_{0.95}\text{-}Ca_{0.05})(Zr_{0.54}\text{-}Ti_{0.46})O_3$+2 wt. percent $WO_3$ +0.75 wt. percent $MnO_2$+2 wt. percent PbO | 48 | 750 | 550 |
| G-1 | $Pb(Zr_{0.43}\text{-}Ti_{0.47}\text{-}Sn_{0.10})O_3$ | 44 | 900 | 200 |
| G-2 | $Pb(Zr_{0.43}\text{-}Ti_{0.47}\text{-}Sn_{0.10})O_3$+2 wt. percent $WO_3$+0.75 wt. percent $MnO_2$+2 wt. percent PbO | 47 | 700 | 600 |
| H-1 | $(Pb_{0.95}\text{-}Mg_{0.05})(Zr_{0.52}\text{-}Ti_{0.48})O_3$ | 42 | 950 | 200 |
| H-2 | $(Pb_{0.95}\text{-}Mg_{0.05})(Zr_{0.52}\text{-}Ti_{0.48})O_3$+2 wt. percent $WO_3$ +0.75 wt. percent $MnO_2$+2 wt. percent PbO | 50 | 1,300 | 500 |

It is apparent from Table 3 that the addition of $WO_3$ and $MnO_2$ to Samples E–1 and F–1 of which base compositions are produced by partially substituting Pb with Ba and Ca respectively, increases the mechanical Q to a great extent, almost twice compared to those of compositions having no additives, despite the fact that the electromechanical coupling coefficient $K_p$ and dielectric constant $\epsilon$ thereof are slightly reduced by such additions.

Said addition to Sample G–1 of which base composition consisting essentially of a solid solution of lead-titanate-zirconate-stannate, increases the electromechanical coupling coefficient $K_p$ slightly and raises the mechanical Q considerably up to three times as high as that of composition having no additives, despite the fact that its dielectric constant $\epsilon$ is slightly reduced.

As clearly shown in the preceding descriptions, it was found that the addition of tungsten and manganese, at a rate corresponding to 0.2–20% by weight of $WO_3$ and at a rate corresponding to 0.075–7.5% by weight of $MnO_2$ respectively, to ceramic composition consisting essentially of lead-titanate-zirconate compounds or to ceramic composition consisting essentially of substitution products of lead in lead-titanate-zirconate compounds with at least one alkaline earth element selected from a group consisting of Ba, Ca, Sr and Mg, improves various characteristics of said ceramic articles required as piezoelectric and electrostrictive materials, particularly improves mechanical Q of said ceramic articles which is especially important in their application to ceramic wave filter, mechanical wave filter and piezoelectric tuning fork.

In addition to the above improvement in properties of ceramic articles, the addition of 2% by weight of $WO_3$ and 0.75% by weight of $MnO_2$ reduces the sintering temperature of the ceramic articles from 1280–1300° C. which is necessary for sintering the composition of $Pb(Zr\text{-}Ti)O_3$ having no additives, to the level of 1200° C. Thus the above addition not only improves the physical properties of the product, but also substantially facilitates mass production of the ceramic articles.

According to the invention, tungsten and manganese can be added in the form of either metallic powder particles or compounds with other elements, and their addition quantities should be within the range of 0.2–20% by weight as converted to equivalent weight of $WO_3$ in case of tungsten and 0.075–7.5% by weight as converted to equivalent weight of $MnO_2$ in case of manganese. The reason for setting the minimum limits at 0.2% of $WO_3$ and at 0.075% of $MnO_2$ is due to the fact that the addition of said metals affects the physical properties of the ceramic articles very sensitively and an addition of 0.2% of $WO_3$ and 0.075% of $MnO_2$ causes sufficient effects. The reason for setting the maximum limits at 20% of $WO_3$ and at 7.5% of $MnO_2$ is due to the fact that addition of said metals in excess of said maximum limits results in deterioration of various physical properties of the products.

In the base composition of $Pb(Zr_{1-x}\text{-}Ti_x)O_3$, $x$ is to be within the range of 0.1–0.6, because ceramic articles having compositions within said range give practicable values of electromechanical coupling coefficient. When the other base composition of $Pb(Zr_y\text{-}Sn_z\text{-}Ti_x)O_3$, which is a derivative of $Pb(Zr\text{-}Ti)O_3$, $x$, $y$ and $z$ are to be within the range of $x=0.1\text{–}0.6$, $y=0\text{–}0.9$, and $z=0\text{–}0.65$ provided that $x+y+z=1$, because said range of composition results in good over-all effects on various physical properties. The preferable ranges of the above $x$, $y$ and $z$ are $x=0.42\text{–}0.52$, $y=0\text{–}0.55$ and $z=0\text{–}0.58$ provided that $x+y+z=1$, which are close to the compositions showing morphotropic transformation.

When a part of Pb in the above base composition of $Pb(Zr\text{-}Ti)O_3$ or $Pb(Zr\text{-}Sn\text{-}Ti)O_3$ is substituted with at least one alkaline earth element selected from a group consisting of Ba, Ca, Sr and Mg, the rate of the substitution is to be less than 30 atom percent, because a substitution in excess of 30 atom percent causes remarkable deterioration of piezoelectric properties of products.

Depending on amounts of tungsten oxide and manganese oxide added to base compositions, lead can be added with advantages, provided that the addition quantity of said lead does not exceed that level which is enough to equilibrate with said additives.

What I claim is:

1. Ceramic articles consisting essentially of a material selected from the group consisting of lead-titanate-zirconate compounds expressed by the formula $$Pb(Zr_{1-x}\text{-}Ti_x)O_3$$

and lead-titanate-zirconate-stannate compounds expressed by the formula $Pb(Zr_y\text{-}Sn_z\text{-}Ti_x)O_3$, wherein $x=0.1$ to 0.6, $y=0$ to 0.9, $z=0$ to 0.65 provided that $x+y+z=1.0$, and containing tungsten at a rate corresponding to 0.2 to 20% by weight of $WO_3$ and manganese at a rate corresponding to 0.075 to 7.5% by weight of $MnO_2$.

2. Ceramic articles according to claim 1, wherein a part of the lead in said materials, which is less than 30 atom percent thereof, is substituted with at least one alkaline earth element selected from the group consisting of barium, calcium, strontium and magnesium.

3. Ceramic articles consisting essentially of material selected from the group consisting of lead-titanate-zirconate compounds expressed by the formula $$Pb(Zr_{1-x}\text{-}Ti_x)O_3$$

and lead-titanate-zirconate-stannate compounds expressed by the formula $Pb(Zr_y\text{-}Sn_z\text{-}Ti_x)O_3$, wherein $x=0.42$ to 0.52, $y=0$ to 0.55, $z=0$ to 0.58 provided that $$x+y+z=1.0$$

and containing tungsten at a rate corresponding to 0.4 to 5% by weight of $WO_3$ and manganese at a rate corresponding to 0.15 to 2.0% by weight of $MnO_2$.

4. Ceramic articles according to claim 3, wherein a part of the lead in said material, which is less than 30 atom percent thereof, is substituted with at least one alkaline earth element selected from the group consisting of barium, calcium, strontium and magnesium.

5. Ceramic articles according to claim 1, which contain a finite quantity of additional lead oxide not exceeding the stoichiometric proportion necessary to balance said tungsten oxide and manganese dioxide as $PbO\cdot WO_3$ and $PbO\cdot MnO_2$ respectively.

6. Ceramic articles according to claim 2, which contain a finite quantity of additional lead oxide not exceeding the stoichiometric proportion necessary to balance said tungsten oxide and manganese dioxide as $PbO\cdot WO_3$ and $PbO\cdot MnO_2$ respectively.

7. Ceramic articles according to claim 1, which consist essentially of lead-titanate-zirconate compounds expressed by the formula $Pb(Zr_{1-x}\text{-}Ti_x)O_3$, wherein $x=0.42$ to 0.52 and contain about 2% by weight of $WO_3$ and about 0.75% by weight of $MnO_2$.

8. A ceramic article according to claim 1, which consists essentially of $Pb(Zr_{0.51}\text{-}Ti_{0.49})O_3$ and contains about 2% by weight of $WO_3$ and about 0.75% by weight of $MnO_2$.

9. Ceramic articles according to claim 2, consisting essentially of lead-strontium-titanate-zirconate compounds expressed by the formula $(Pb_{1-a}\text{-}Sr_a)(Zr_{1-x}\text{-}Ti_x)O_3$, wherein $a=0.02$ to 0.15, $x=0.42$ to 0.52, and containing about 2% by weight of $WO_3$ and about 0.4% by weight of $MnO_2$.

10. A ceramic article according to claim 2, consisting essentially of $(Pb_{0.95}\text{-}Sr_{0.05})(Zr_{0.54}\text{-}Ti_{0.46})O_3$, and containing about 2% by weight of $WO_3$ and about 0.4% by weight of $MnO_2$.

11. Ceramic articles according to claim 2, consisting essentially of lead-barium-titanate-zirconate compounds expressed by the formula $(Pb_{1-a}\text{-}Ba_a)(Zr_{1-x}\text{-}Ti_x)O_3$, wherein $a$=0.02 to 0.20, $x$=0.42 to 0.52, and containing about 2% by weight of $WO_3$ and about 0.75% by weight of $MnO_2$.

12. A ceramic article according to claim 2, consisting essentially of $(Pb_{0.825}\text{-}Ba_{0.175})(Zr_{0.54}\text{-}Ti_{0.46})O_3$, and containing about 2% by weight of $WO_3$ and about 0.75% by weight of $MnO_2$.

13. A transducer element comprising a piezoelectric and electrostrictive ceramic article according to claim 1.

14. A transducer element comprising a piezoelectric and electrostrictive ceramic article according to claim 2.

References Cited

UNITED STATES PATENTS

| | | | |
|---|---|---|---|
| 2,980,546 | 4/1961 | Plessner et al. | 106—39 |
| 3,264,217 | 8/1966 | Kulcsar | 252—62.9 |

OTHER REFERENCES

Matsuo et al., "Lead Titanate Ceramics Doped with Manganese Oxide," Journal of the American Ceramic Society, vol. 48, No. 2, February 1965.

TOBIAS E. LEVOW, *Primary Examiner.*

ROBERT D. EDMONDS, *Examiner.*